No. 693,825. Patented Feb. 25, 1902.
H. W. BOLENS.
SEAT SPIDER.
(Application filed Mar. 14, 1901.)
(No Model.)
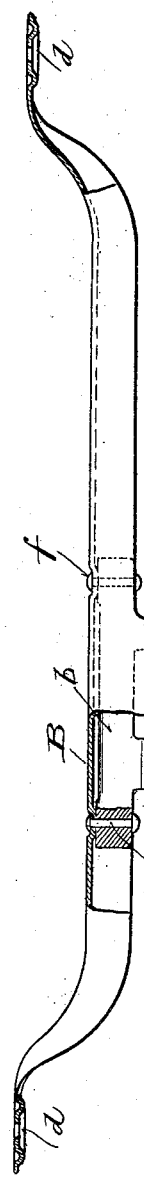
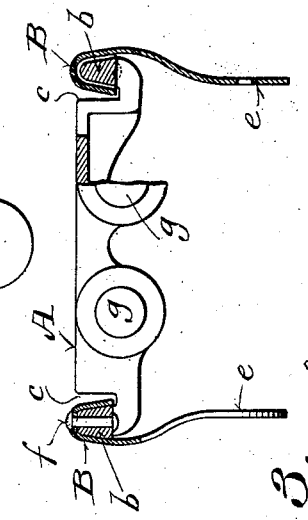
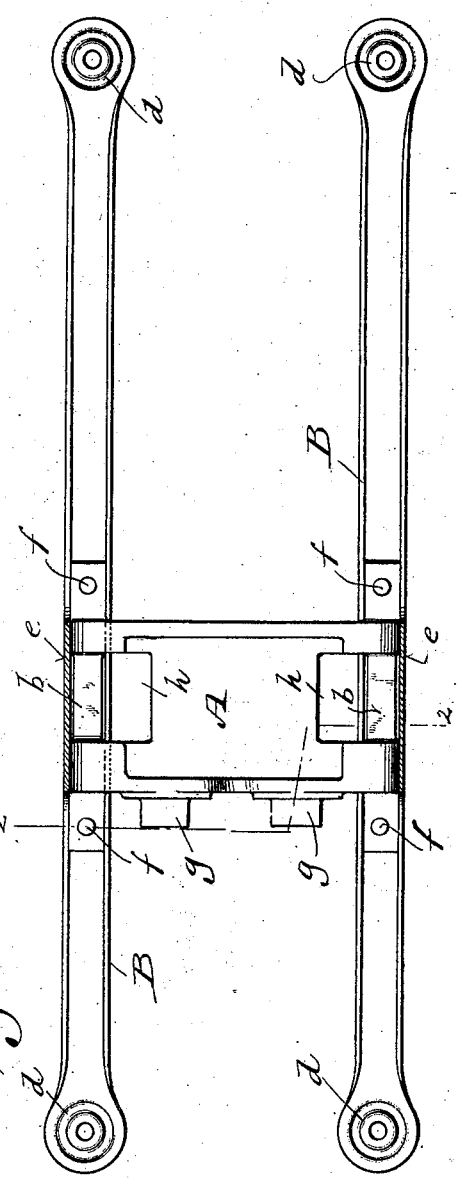
Witnesses:
Geo N Young
N. E. Oliphant
Inventor
Harry W. Bolens,
By H. G. Underwood
Attorney
THE NORRIS PETERS CO., PHOTO-LITHO., WASHINGTON, D. C.

UNITED STATES PATENT OFFICE.

HARRY W. BOLENS, OF PORT WASHINGTON, WISCONSIN.

SEAT-SPIDER.

SPECIFICATION forming part of Letters Patent No. 693,825, dated February 25, 1902.

Application filed March 14, 1901. Serial No. 51,093. (No model.)

*To all whom it may concern:*

Be it known that I, HARRY W. BOLENS, a citizen of the United States, and a resident of Port Washington, in the county of Ozaukee and State of Wisconsin, have invented certain new and useful Improvements in Seat-Spiders; and I do hereby declare that the following is a full, clear, and exact description thereof.

My invention has for its object to provide the chair and stool trade with economical spiders of the kind comprising sheet-metal arms made fast to spreaders and attachable at their ends to seats, said invention consisting in certain peculiarities of construction and combination of parts hereinafter particularly set forth with reference to the accompanying drawings and subsequently claimed.

Figure 1 of the drawings represents a partly-sectional side elevation of a tilt-seat spider made in accordance with my invention; Fig. 2, a transverse sectional view of the spider, this view being indicated by lines 2 2 in the third figure; and Fig. 3, a plan view of said spider inverted and partly in horizontal section.

Referring by letter to the drawings, A indicates a transverse spreader, and B each of a pair of parallel arms made independent of each other and the spreader, but fastened to said spreader in practice, this assemblage of parts constituting a seat-spider in accordance with my invention.

The spreader herein shown is a one-piece casting; but I do not wish to be understood as limiting myself to a cast-metal spreader, as it may be otherwise in some instances.

Each of the arms B is of sheet-steel, semi-tubular or inverted-U shape in cross-section for the greater portion of its length, and is herein shown supported upon and approximating in shape in cross-section a shoulder $b$ of the spreader, to which it is made fast, this shoulder constituting the outer wall of a transverse spreader-groove $c$. Each arm B is also horizontal for a portion of its length and is bent to have its ends at a greater elevation than the remainder thereof, these ends being flattened and apertured for the engagement of bolts or rivets by which they are held snug against the under side of a seat, it being preferable to die-shape said ends of the arm, so as to form countersinks $d$ for the heads of fastening devices, this construction being herein shown.

Depending from the outer wall of each arm B and integral therewith is a pivot-ear $e$ of the spider. The pivot-ears herein set forth take the places of those that have heretofore been formed as a part of or secured to the spreader portion of a spider. The spider-arms and pivot-ears being of sheet-steel and integral with each other, as above specified, they will withstand blows, vibrations, and other causes detrimental to cast-metal counterparts.

The spreader-shoulders $b$ are herein shown highest and thickest at their ends to thereby avoid necessity of dressing said shoulders throughout their length to insure smooth close fit of the arms B thereon, rivets $f$ being also herein shown as means for fastening said arms to the aforesaid shoulders.

The spreader A is shown provided with supporting-lugs $g$ for spiral tension-springs commonly employed in conjunction with tilt-seat spiders, and the end shoulders $b$ of said spreader preferably are extended beyond the edges of the spreader, the latter being intersected by play-slots $h$ for stop-ears of an ordinary tilt-seat standard.

While the spider herein shown and particularly described is especially designed for tilt-seat chairs, my invention in some of its details is applicable to other varieties of chairs and to various kinds of stools, it being practical to vary the structural details of said spider in some particulars, according to its utility in the chair and stool trade, without departure from the essential characteristics of said invention.

It is to be noticed that the preferably spider arms B are flattened where they are riveted to the spreader, this flattening being done in order that full round and clean holes for the engagement of the rivets or equivalent fastening devices may be punched in the metal, no burs being left to make uneven contact with the spreader.

Having thus described my invention, what I claim as new, and desire to secure by Letters Patent, is—

1. A seat-spider comprising a spreader, a pair of sheet-metal arms curved in cross-section having integral depending pivot-ears, and means by which the arms are fastened to said spreader.

2. A seat-spider comprising a cast-metal spreader, a pair of sheet-metal arms curved in cross-section having integral depending pivot-ears, and means by which the arms are fastened to said spreader.

3. A seat-spider comprising a spreader the body portion of which is provided with transverse grooves and end shoulders, sheet-metal and semitubular arms fast on the spreader-shoulders and engaging the grooves, and pivot-ears depending from the arms.

4. A seat-spider comprising a spreader the body portion of which is provided with play-slots for stop-ears of a tilt-seat standard, transverse shoulders at the ends of the body portion and intermediate grooves, said end shoulders constituting outer walls of the grooves; sheet-metal spider-arms fast on the spreader-shoulders and having their inner edges resting within the grooves, and pivot-ears depending from the arms.

5. A spider-arm for chair-spiders, said arm being formed of sheet metal and having a depending integral pivot-ear, and adapted at its ends for attachment to a chair-seat and between its ends for attachment to a chair-spreader.

6. As an article of manufacture, a sheet-metal spider-arm, for chair-spiders, the same being semitubular or curved in cross-section, having one of its walls extended to form a pivot-ear and terminating in attaching-ears.

7. A chair-spider, comprising a spreader, provided at its opposite edges with ribs or shoulders convexed in cross-section and spaced from the spreader, and spider-arms semitubular in cross-section and approximating and mounted on the said shoulders.

In testimony that I claim the foregoing I have hereunto set my hand, at Milwaukee, in the county of Milwaukee and State of Wisconsin, in the presence of two witnesses.

HARRY W. BOLENS.

Witnesses:
 N. E. OLIPHANT,
 B. C. ROLOFF.